United States Patent [19]

Rampignon

[11] Patent Number: 4,618,794
[45] Date of Patent: Oct. 21, 1986

[54] ELECTRIC MOTOR FOR DRIVING ELEMENTS OF MOTOR VEHICLES IN TWO OPPOSITE DIRECTIONS WITH A HIGHER RESISTING FORCE IN ONE DIRECTION THAN IN THE OTHER, SUCH AS WINDOW RAISERS OR PIVOTAL SEAT BACKS

[75] Inventor: Marc Rampignon, Villemonble, France

[73] Assignee: Compagnie Industrielle de Mecanismes en agrege C.I.M., France

[21] Appl. No.: 715,849

[22] Filed: Mar. 25, 1985

[30] Foreign Application Priority Data

Mar. 26, 1984 [FR] France ............... 84 04666

[51] Int. Cl.$^4$ ........................... H02K 13/04
[52] U.S. Cl. ......................... 310/234; 310/198
[58] Field of Search ............... 310/198–208, 310/233, 234, 239, 154

[56] References Cited

U.S. PATENT DOCUMENTS

| | | | |
|---|---|---|---|
| 3,733,506 | 5/1973 | Jaffe | 310/198 |
| 4,341,971 | 7/1982 | Tahara | 310/204 |
| 4,366,403 | 12/1982 | Simpson | 310/239 |
| 4,414,481 | 11/1983 | deJong | 310/154 |
| 4,437,028 | 3/1984 | Ikeda | 310/198 |
| 4,437,029 | 3/1984 | Ban | 310/154 |
| 4,447,751 | 5/1984 | Ban | 310/154 |

FOREIGN PATENT DOCUMENTS

| | | | |
|---|---|---|---|
| 0539734 | 7/1955 | Belgium | 310/234 |
| 0027505 | 3/1977 | Japan | 310/234 |

Primary Examiner—R. Skudy

[57] ABSTRACT

The electric motor is of the type in which the speed of rotation as a function of the resisting torque is different in one direction of rotation than in the other, and comprises a pair of brushes (B1, B2) placed between field poles (P1, P2) and cooperative with an armature structure consisting of a commutator (14) rigid with an armature support (12) through which the shaft of the motor extends and in which are formed slots in which are wound wires connecting a series of strips (1,2 ...) of which the commutator (14) is formed, wherein each plane (L) containing the geometric axis (XX) of the motor and passing through the middle of a strip (1,2 ... 8) of the commutator (14) halfway between two consecutive slots (15) of the commutator is offset by a given angle $\beta$ relative to the corresponding plane (K) passing through two diametrically opposed slots (B,F) of the armature support (12) in the direction of rotation (R) of the motor employed for the rising of the driven element.

2 Claims, 8 Drawing Figures

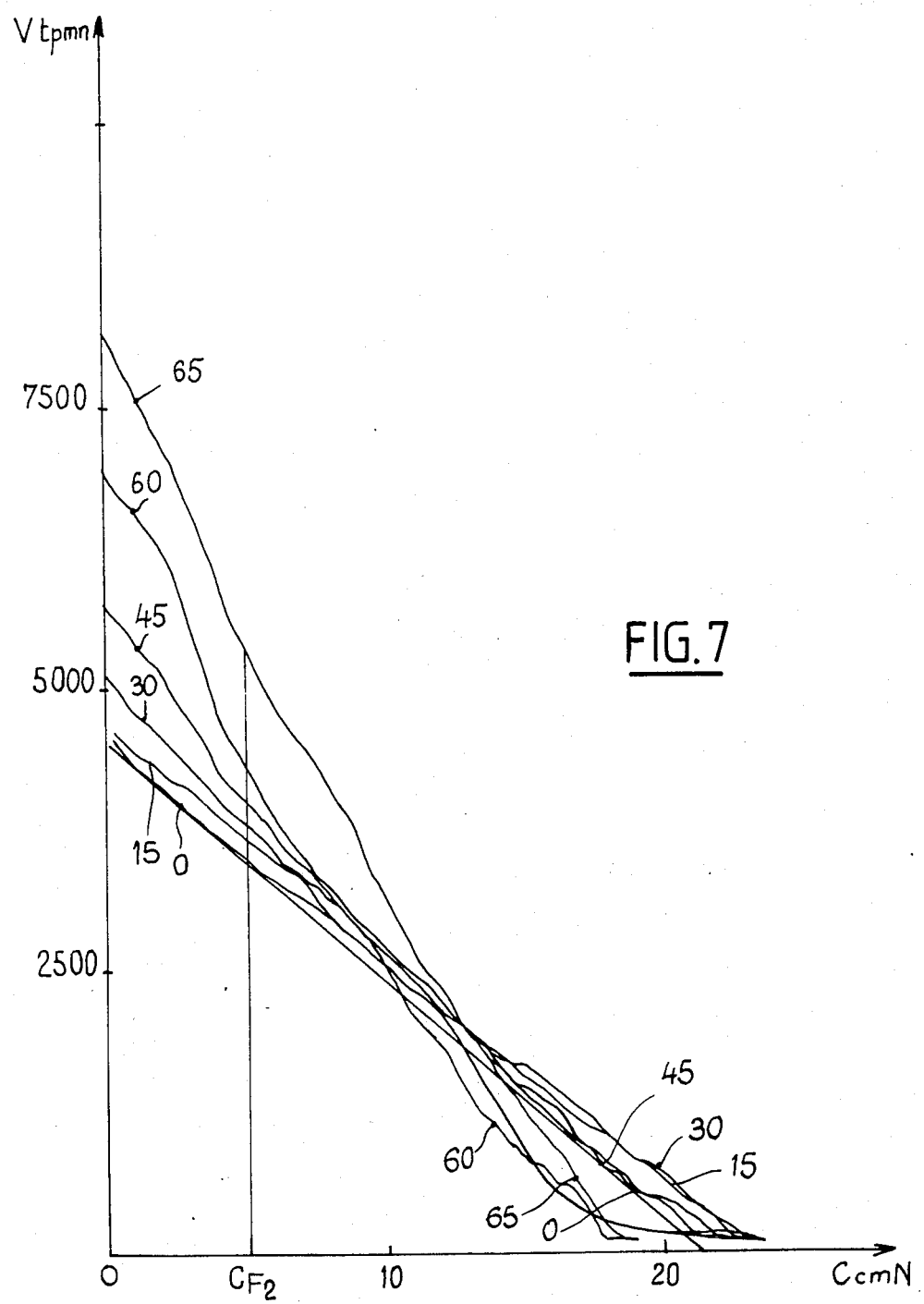

ELECTRIC MOTOR FOR DRIVING ELEMENTS OF MOTOR VEHICLES IN TWO OPPOSITE DIRECTIONS WITH A HIGHER RESISTING FORCE IN ONE DIRECTION THAN IN THE OTHER, SUCH AS WINDOW RAISERS OR PIVOTAL SEAT BACKS

FIELD OF THE INVENTION

The present invention relates to an electric motor for driving elements of motor vehicles in two opposite directions, with a higher resisting force in one direction than in the other, these elements being for example window raisers, pivotal seat backs, seat slides, door or compartment closing devices or sliding rooves.

BACKGROUND OF THE INVENTION

More particularly, the electric motor concerned is of the type whose mechanical characteristic, i.e. the speed of rotation as a function of the resisting torque, is different in one direction of rotation than in the other.

The motor of the considered type comprises, in the known manner, a pair of brushes placed between two field poles and cooperable with an armature structure consisting of a commutator rigid with an armature support through which the shaft of the motor extends and in which are formed slots in which are wound connection wires of a series of strips or segments from which the commutator is formed, the armature support being rotatable about its axis between two permanent magnets.

It is known that in some window-raiser devices devoid of a balancing spring, or when the latter is eliminated for reasons of cheapness, the mechanism of the window raiser must overcome resisting forces which are higher when rising (friction forces to which is added the weight of the window glass) than when descending (friction forces from which the weight of the window glass is subtracted since the glass becomes driving means). Further, the shock-absorbing capacity at the end of the travel of this mechanism is higher when reaching the upper stop. It will be understood that excessive descending speed unnecessarily increases the fatigue of the mechanism which must be designed to take this into account.

Moreover, in the case where the purpose is to control or drive an element formed by a seat back, it is desirable to arrange that the blocked torque, i.e. the torque exerted by the motor when the lower stop is reached and the seat back has reached its lowermost position, be not too high so as to ensure conditions of safety for the passenger located behind the lowered seat back.

SUMMARY OF THE INVENTION

An object of the invention is to overcome these problems by the use of an electric motor which is so adapted as to avoid substantially modifying the speed in the direction of the force having the lower resistance (for example the downward travel of a window raiser) while it does not reduce or increases its speed in the other direction (that corresponding to the rising of a window raiser for example), relative to the corresponding speeds of motors employed up to the present time.

According to a first embodiment of the invention, each plane containing the geometric axis of the motor passing through the middle of a strip of the commutator, midway between two consecutive slots of the latter, is offset by a given angle relative to the corresponding plane passing through two diametrically opposed slots of the armature, in the direction of rotation of the motor employed corresponding to the higher resisting force (the rising of a window raiser for example).

The angular offset may vary within wide limits, for example between about 0° and 65°. It has found that under these conditions in respect of a motor subjected to a resisting torque close to the operating torque, the speed in the direction of the force of the lower resistance (descent of the window raiser for example) is not substantially modified, while its speed is increased in the opposite direction (the rising of a window raiser for example). Under these conditions, a less powerful and consequently a cheaper motor may be used for rendering the speeds equal in the two directions of rotation (rising and descent for example) with different resisting torques.

Further features and advantages of the invention will be apparent from the following description with reference to the accompanying drawings which illustrate several embodiments by way of non-limiting examples.

BRIEF DESCRIPTION OF THE DRAWINGS

FIGS. 6 and 7 are diagrams illustrating examples of speeds of rotation of the motor as a function of its resisting torque, respectively in the direction of the force having the lower resistance of the driven element in respect of FIG. 6 and in the direction of the force having the higher resistance of this element in respect of FIG. 7.

Figure 1:
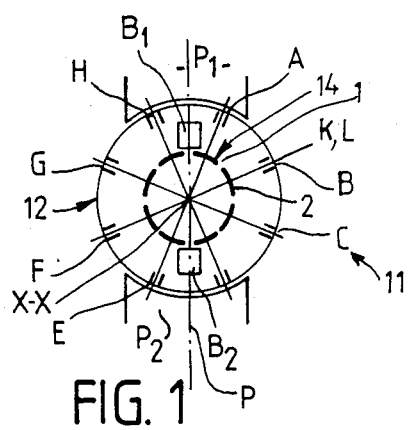
FIG. 1 is a partial diagrammatic end elevational view of a conventional electric motor.
Figure 5:
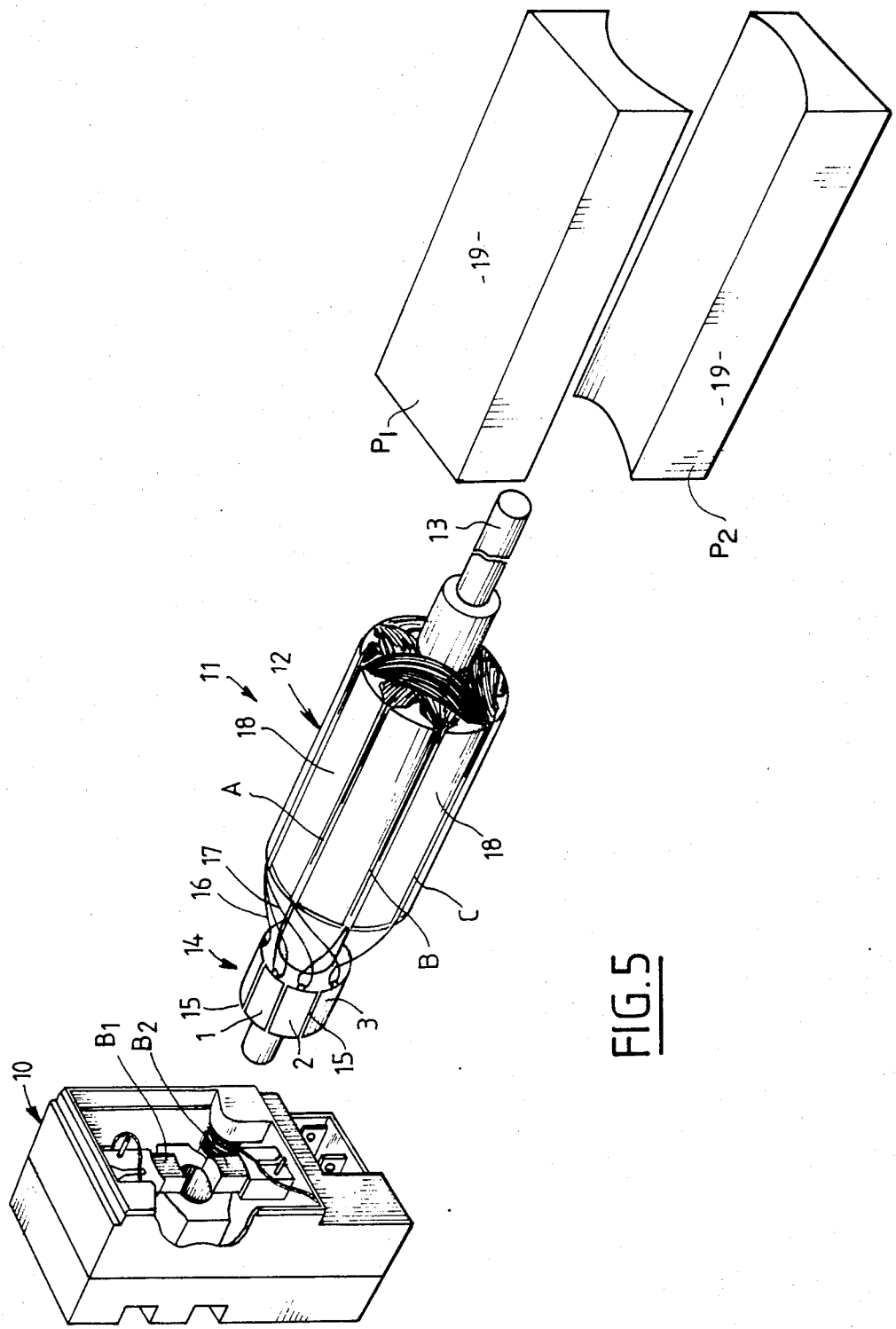
FIG. 5 is an exploded perspective view at full scale of an electric motor according to the invention.

The electric motor shown in FIGS. 1 and 5 comprises, in the known manner, a housing 10 containing two conductive brushes B1, B2. The motor also includes an armature structure 11 formed by a cylindrical armature support 12 rigid with a shaft 13 and having a series of longitudinally extending parallel slots (A, B, C, ... H), which are eight in number in this embodiment but which may of course vary, and by a commutator 14 connected to rotate with the shaft 13, this commutator being cooperative with the brushes B1, B2. The commutator 14 comprises a series of cylindrical strips or segments, namely eight strips in the presently-described embodiment, having the reference numerals 1, 2, 3, ... 8. The strips 1, 2, ... 8 are separated from each other by slots or gaps 15 which are parallel to one another and to the shaft 13 extending through the armature support 12. The armature structure 11 is completed by wires such as 16, 17 ... forming a winding providing the electric connection between the strips, 1, 2, ... of the commutator 14 in passing in the slots (A, B, C ... H) around the elements 18 of the armature support 12 separated by these slots. The motor is completed by field poles P1, P2 formed by two permanent magnets 19 which are mounted in a case (not shown) on each side of the armature structure 11. The field poles P1, P2 determine a theoretical neutral line P in practice for the armature structure 11.

Figure 2:
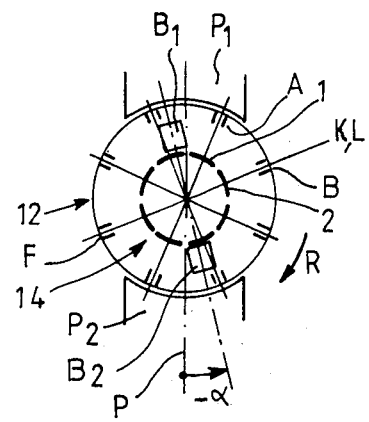
FIG. 2 is a view similar to FIG. 1 of a second electric motor of known type.

In a motor constructed in the known manner (FIG. 2), the brushes B1 and B2 are offset by a given angle $(-\alpha)$ relative to the theoretical neutral line P formed by a straight line perpendicular to the shaft 13 and joining the two poles P1 and P2, as mentioned above. This angular offset $(-\alpha)$ is in the direction opposed to the direction R of rotation of the motor for shifting the element driven by the latter in the direction in which the resisting force is the higher (the rising of a window raiser for example). The direction of rotation R shown in FIG. 2 is the clockwise direction. The magnitude of the offset $(-\alpha)$ may vary within wide limits, for example between 0° and 65° maximum.

In a first feature of the motor according to the invention, each plane L containing the geometric axis X—X of the motor (coaxial with the shaft 13) and passing through the middle of a strip 1, 2, 3 . . . of the commutator 14, is offset by a given angle $\beta$ (FIG. 3) relative to the corresponding plane K passing through two diametrically opposed slots of the armature 12 (B, F, for example), in the direction of rotation R of the motor corresponding to that of the higher resisting force of the driven element (for example that corresponding to the rising of a window raiser).

Figure 3:
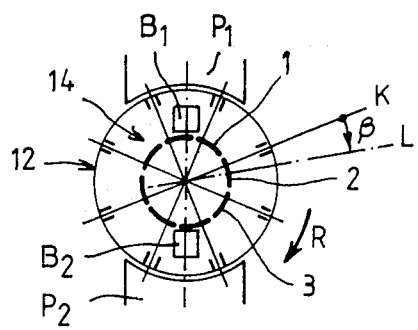
FIG. 3 is a diagrammatic view similar to FIGS. 1 and 2 of a first embodiment of an electric motor according to the invention.

A comparison of FIGS. 1 and 3 clearly shows the angular offset $\beta$. As the brushes B1, B2 have remained in their original position of FIG. 1, the offset $\beta$ corresponds to an offset of the strips 1, 2, 3 . . . of the commutator 14 relative to the slots (A, B . . . ) of the armature structure 12. In practice, this angular offset may be between 0° and 65° maximum.

Figure 4A:
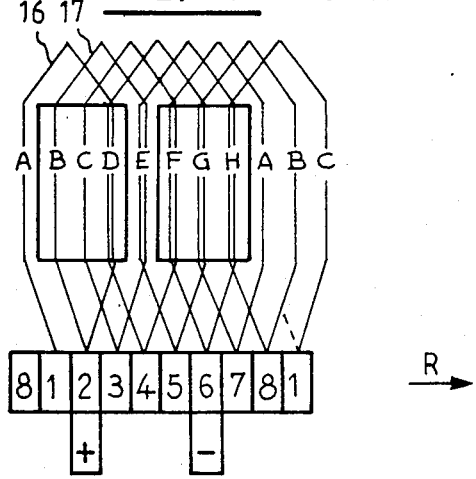
FIG. 4A is a diagrammatic view of the manner in which the winding is effected on a conventional electric motor between the strips of the commutator and the slots of the armature.
Figure 4B:
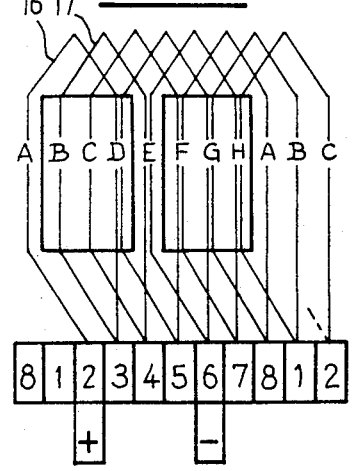
FIG. 4B is similar to FIG. 4A showing the manner in which the winding is effected in the motor in a second embodiment of the invention.

FIG. 4A shows the development of the winding of a conventional electric motor and FIG. 4B shows the development of this winding in accordance with the invention.

In the conventional arrangement of the winding, the connection wires 16, 17 . . . are wound in accordance with a progression : 1 - AD - 2 - BE - 3 - CF - 4 - DG - 5 - EH - 6 - FA - 7 - GB - 8 - HC - 1, illustrated in FIG. 4A.

In the embodiment according to the invention (FIG. 4B), the connecting wires 16, 17 . . . are wound in accordance with the progression : 2 - AD - 3 - BE - 4 - CF - 5 - DG - 6 - EH - 7 - FA - 8 - GB - 1 - HC - 2. In this way, there is achieved an angular offset of a strip (1, 2 . . . ) relative to the line P of the field poles P1, P2 in the connection of the winding to the commutator 14 in the direction of rotation R of the motor.

The winding illustrated in FIG. 4B may be produced without angularly shifting the commutator 14 or be combined with the arrangement illustrated in FIG. 3. In practice, the result obtained is the same whether the commutator 14 is offset angularly relative to the neutral line P or whether the connection to the commutator 4 of the connecting wires 16, 17 . . . is offset angularly.

The embodiments described hereinbefore concern an armature 12 having eight slots and eight commutator strips, but may of course be applied by extrapolation to armatures having n slots and N commutator strips.

Figure 6:
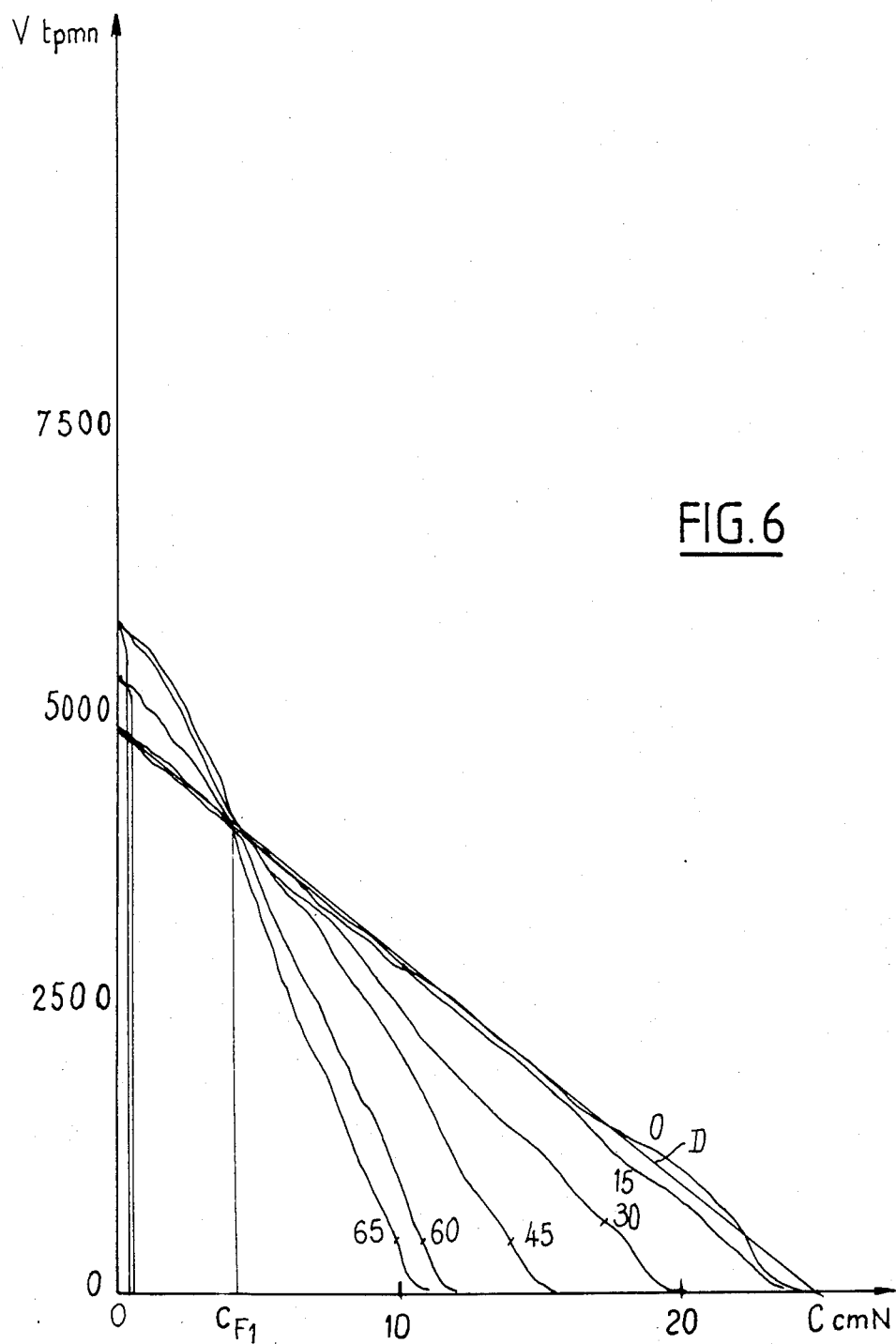

FIGS. 6 and 7 show diagrams illustrating the characteristics of an electric motor according to the invention, the variation in its speed of rotation V in rpm being plotted against its resisting torque C (in cmN).

FIG. 6 shows the variation in the speed of the motor as a function of the resisting torque in the direction of the lower resisting force of the driven element, (window raiser or seat back for example) in respect of angular offsets $-\alpha$ or $\beta$ between 0° and 65°, the values 0°, 15°, 30°, 45°, 60°, 65° being respectively plotted on the curves. It can be seen that, relative to a reference straight line D substantially corresponding to an angular offset equal to 0, the blocked torque decreases as the angular offset increases. Further, for a given resisting torque corresponding to a motor of a given power and in practice weak in this direction of rotation, it can be seen that the descending speed varies little for an angular offset $-\alpha$ or $\beta$ between 0° and 65°. The value of the torque $C_{F1}$ is close to that of the operating torque in the direction of the lower resisting torque.

The diagram of FIG. 7 shows a reference straight line OO corresponding to the mechanical characteristic of a motor whose angular offset $-\alpha$ or $\beta$ is zero, this FIG. 7 also showing the curves of the speed of rotation as a function of the resisting torque in respect of angular offsets of 15°, 30°, 45°, 60° and 65°.

It can be seen that with a given resisting torque, an increase in the angular offset $-\alpha$ and/or $\beta$ increases the speed of the motor (except in respect of high torques close to the blocked torque which are far from the operating torques in practice).

Consequently, a less powerful and therefore cheaper motor may be used for rendering the speeds V equal in both directions of rotation (rise and descent of a window raiser for example) with different torques for the same motor. The value of the torque $C_{F2}$ is close to that of the operating torque in the direction of the higher resisting force.

In the application of the motor according to the invention to the driving of an articulated vehicle seat back, the following requirements are satisfied: in the direction of the rise of the seat back, a large torque is required for raising the seat back, while in the descending direction, it is desirable to obtain a low blocked torque so as to ensure safety of the rear passengers. It is indeed clear from FIG. 6 that an increase in the angular offset decreases the blocked torque. It is true that the speed for a given moderate or high resisting torque is decreased at the same time, but this is not troublesome in the descending direction since the resisting torque is low in this direction. In the rising direction (FIG. 7) in respect of a given resisting torque and a given motor, the speed increases, or, at a constant rising speed, a motor which is less powerful and therefore cheaper than motors usually employed may be accepted. This motor will have a lower blocked torque for the descent.

More generally, the main advantage of the invention resides in the fact that, in starting with a motor having a given torque, one reduces the blocked torque in the descending direction or in the direction of the lower resisting force while the speed in the other direction is not reduced or is increased.

The reduction in the blocked motor torque (developed at 0 speed in the lower stop position as explained before) has yet another advantage in the case of a window raiser. Indeed, the latter may be either lightened since it may be less strong or have a longer life if its strength is preserved while bearing in mind that the capacity of absorbing the shock against the stop of these mechanisms is usually lower against the lower stop than against the upper stop.

The invention is advantageously applicable to any electric mechanism for driving an element in a direction of displacement having a high resisting force and in another direction having a low resisting force, employing a motor having a commutator in both directions of rotation but with different resisting torques. In the automobile field, the invention is consequently applicable to mechanisms for driving or actuating window raisers, sliding rooves, articulated seat backs, electric door or compartment closing means, etc.

What is claimed is:

1. An electric motor of the type in which the speed of rotation as a function of the resisting torque is different in one direction of rotation than in an opposite direction, said motor comprising: (a) field poles; (b) a pair of brushes placed between the field poles; (c) an armature structure having an armature support defining a plurality of armature slots designated A, B, C, . . .; (d) a commutator connected to rotate with the armature support and having a series of commutator strips defining commutator slots therebetween; (e) a motor shaft extending through the armature support; and, (f) wires connecting said series of commutator strips wound in said armature slots, the brushes being cooperative with said armature structure, said wires connecting the commutator strips (1,2,3 . . . ) and wound in said armature slots (A,B,C, . . . ) being wound in accordance with the following progression: 2 - AD - 3 - BE - 4 - CF - 5 - DG - 6 - EH - 7 - FA - 8 - GB - 1 - HC - 2 . . . so as to achieve an angular offset of a commutator strip (1,2,3 . . . ) relative to a line through the field poles in the connection of the winding to the commutator in the direction of rotation of the armature structure.

2. A motor according to claim 1, wherein said angular offset is between 0° and 65°.

* * * * *